US012719591B2

(12) United States Patent
Gonzalez Gonzalez et al.

(10) Patent No.: US 12,719,591 B2
(45) Date of Patent: Aug. 25, 2026

(54) ESTIMATION METHOD OF DISCRETE DIGITAL SIGNALS IN NOISY OVERLOADED WIRELESS COMMUNICATION SYSTEMS WITH CSI ERRORS

(71) Applicant: Continental Automotive Technologies GmbH, Hannover (DE)

(72) Inventors: David Gonzalez Gonzalez, Egelsbach (DE); Andreas Andrae, Frankfurt am Main (DE); Osvaldo Gonsa, Frankfurt (DE); Hiroki Iimori, Yokahama (JP); Giuseppe Thadeu Freitas de Abreu, Bremen (DE); Razvan-Andrei Stoica, Essen (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 551 days.

(21) Appl. No.: 17/916,660

(22) PCT Filed: Apr. 1, 2021

(86) PCT No.: PCT/EP2021/058578
§ 371 (c)(1),
(2) Date: Feb. 23, 2023

(87) PCT Pub. No.: WO2021/198404
PCT Pub. Date: Oct. 7, 2021

(65) Prior Publication Data

US 2023/0171023 A1 Jun. 1, 2023

(30) Foreign Application Priority Data

Apr. 3, 2020 (DE) ..................... 10 2020 204 395.7
Apr. 3, 2020 (DE) ..................... 10 2020 204 396.5
Apr. 3, 2020 (DE) ..................... 10 2020 204 397.3

(51) Int. Cl.
*H04B 17/18* (2015.01)
*H04B 1/12* (2006.01)
(Continued)

(52) U.S. Cl.
CPC ............... *H04B 17/18* (2015.01); *H04B 1/12* (2013.01); *H04B 7/0626* (2013.01); *H04B 17/12* (2015.01);
(Continued)

(58) Field of Classification Search
CPC ........ H04B 17/18; H04B 17/12; H04B 17/13; H04B 1/12; H04L 25/029
See application file for complete search history.

(56) References Cited

U.S. PATENT DOCUMENTS 7,555,064 B2 6/2009 Beadle
8,488,711 B2 7/2013 Huang
(Continued)

FOREIGN PATENT DOCUMENTS

CN 1841987 A 10/2006
CN 102176287 A 9/2011
(Continued)

OTHER PUBLICATIONS

Cheng Qian et al.: "Resource Allocation for Device-to-Device Aided Cooperative NOMA with Imperfect CSI", 2019 26th International Conference on Telecommunications (ICT), IEEE< Apr. 8, 2019 (Apr. 8, 2019), p. 113-118, XP033596546, DOI: 10.1109/ICT.2019.8798839 [retrieved on Aug. 13, 2019] (Year: 2019).*
(Continued)

*Primary Examiner* — Brenda H Pham

(57) ABSTRACT

A computer-implemented reconstruction method of discrete digital signals in noisy overloaded wireless communication systems with CSI Errors that is characterized by a channel matrix of complex coefficients, the method including receiv-
(Continued)

ing the signal from channel by a signal detector, estimation of the CSI error parameter τ is done at the receiver, estimation noise power is done by a noise power estimator, forwarding the detected signal and the CSI error parameter τ and noise power estimation to a decoder that estimates the transmitted symbol, wherein the estimation of the decoder produces a symbol that could probably have been transmitted it is forwarded to a de-mapper, which outputs the bit estimates corresponding to the estimated transmit signal and the corresponding estimated symbol to a microprocessor for further processing.

14 Claims, 4 Drawing Sheets

(51) Int. Cl.

*H04B 7/06* (2006.01)
*H04B 17/12* (2015.01)
*H04B 17/13* (2015.01)
*H04L 1/00* (2006.01)
*H04L 25/02* (2006.01)

(52) U.S. Cl.

CPC .......... *H04B 17/13* (2015.01); *H04L 1/0039* (2013.01); *H04L 25/021* (2013.01)

(56) References Cited

U.S. PATENT DOCUMENTS

| | | | |
|---|---|---|---|
| 8,699,592 | B1 | 4/2014 | Choi et al. |
| 8,843,096 | B2 | 9/2014 | Becker |
| 9,112,744 | B1 | 8/2015 | Venkatesh et al. |
| 9,312,929 | B2 | 4/2016 | Forenza |
| 9,344,303 | B1 | 5/2016 | Moshavi et al. |
| 10,277,290 | B2 | 4/2019 | Forenza |
| 10,349,417 | B2 | 7/2019 | Forenza |
| 10,425,134 | B2 | 9/2019 | Perlman |
| 2004/0203427 | A1 | 10/2004 | Hill |
| 2006/0227889 | A1 | 10/2006 | Uchida et al. |
| 2007/0127603 | A1 | 6/2007 | Niu et al. |
| 2007/0275727 | A1 | 11/2007 | Lee et al. |
| 2008/0130719 | A1 | 6/2008 | Bottomley et al. |
| 2008/0166975 | A1 | 7/2008 | Kim et al. |
| 2008/0279298 | A1 | 11/2008 | Ben-Yishai |
| 2009/0074050 | A1 | 3/2009 | Wang et al. |
| 2009/0213944 | A1 | 8/2009 | Grant |
| 2010/0194405 | A1 | 8/2010 | Yu |
| 2011/0222638 | A1 | 9/2011 | Park et al. |
| 2012/0045024 | A1 | 2/2012 | Cui et al. |
| 2012/0045995 | A1 | 2/2012 | Nakano et al. |
| 2013/0201947 | A1 | 8/2013 | Wong |
| 2014/0082459 | A1 | 3/2014 | Li et al. |
| 2016/0315791 | A1 | 10/2016 | Barbu et al. |
| 2016/0344459 | A1 | 11/2016 | Chen |
| 2017/0102982 | A1 | 4/2017 | Kolandavelu et al. |
| 2017/0346518 | A1 | 11/2017 | Lim et al. |
| 2018/0091261 | A1 | 3/2018 | Sayeed et al. |
| 2018/0102882 | A1 | 4/2018 | Nakamura |
| 2018/0167175 | A1 | 6/2018 | Al-Dweik et al. |
| 2018/0183650 | A1 | 6/2018 | Zhang |
| 2018/0234948 | A1 | 8/2018 | Ren |
| 2018/0248575 | A1 | 8/2018 | Bardin |
| 2018/0278316 | A1 | 9/2018 | Yang et al. |
| 2018/0279270 | A1 | 9/2018 | Sano et al. |
| 2018/0323846 | A1 | 11/2018 | Tsai et al. |
| 2019/0199384 | A1 | 6/2019 | Pekoz et al. |
| 2019/0222281 | A1 | 7/2019 | Sirotkin et al. |
| 2019/0229863 | A1 | 7/2019 | Lei |
| 2019/0245646 | A1 | 8/2019 | Robert Safavi |
| 2020/0014473 | A1 | 1/2020 | Decurninge et al. |
| 2021/0176008 | A1 | 6/2021 | Wang et al. |
| 2022/0417065 | A1 | 12/2022 | Gonzalez Gonzalez |
| 2023/0026867 | A1 | 1/2023 | Gonzalez Gonzalez |
| 2023/0144250 | A1 | 5/2023 | Gonzalez Gonzalez |
| 2023/0171023 | A1 | 6/2023 | Gonzalez Gonzalez et al. |
| 2023/0198811 | A1 | 6/2023 | Gonzalez Gonzalez |

FOREIGN PATENT DOCUMENTS

| | | | |
|---|---|---|---|
| CN | 103119994 | A | 5/2013 |
| CN | 103780293 | A | 5/2014 |
| CN | 104601213 | A | 5/2015 |
| CN | 104796239 | A | 7/2015 |
| CN | 105282060 | A | 1/2016 |
| CN | 106411796 | A | 2/2017 |
| CN | 106712903 | A | 5/2017 |
| CN | 106817334 | A | 6/2017 |
| CN | 107483376 | A | 12/2017 |
| CN | 107566059 | A | 1/2018 |
| CN | 108173575 | A | 6/2018 |
| CN | 109474388 | A | 3/2019 |
| CN | 110071748 | A | 7/2019 |
| CN | 110417515 | A | 11/2019 |
| CN | 114641972 | A | 6/2022 |
| CN | 115336208 | A | 11/2022 |
| CN | 115336209 | A | 11/2022 |
| CN | 115362645 | A | 11/2022 |
| EP | 2830271 | A1 | 1/2015 |
| EP | 3427389 | A1 | 1/2019 |
| EP | 2483730 | B1 | 11/2019 |
| EP | 2909939 | B1 | 3/2021 |
| EP | 3353773 | B1 | 1/2023 |
| JP | 2013522943 | A | 6/2013 |
| JP | 2015056690 | A | 3/2015 |
| JP | 2017521885 | A | 8/2017 |
| KR | 20050013011 | A | 2/2005 |
| KR | 20060055924 | A | 5/2006 |
| KR | 20070036746 | A | 4/2007 |
| KR | 20100073067 | A | 7/2010 |
| KR | 20120125649 | A | 11/2012 |
| KR | 20130095216 | A | 8/2013 |
| KR | 20170119924 | A | 10/2017 |
| KR | 20180046350 | A | 5/2018 |
| KR | 20180091500 | A | 8/2018 |
| KR | 101918584 | B1 | 11/2018 |
| WO | 2010125760 | A1 | 11/2010 |
| WO | 2015186130 | A1 | 12/2015 |
| WO | 2017057655 | A1 | 4/2017 |
| WO | 2017057834 | A1 | 4/2017 |
| WO | 2017071540 | A1 | 5/2017 |
| WO | 2017204469 | A1 | 11/2017 |
| WO | 2018210256 | A1 | 11/2018 |
| WO | 2021083495 | A1 | 5/2021 |
| WO | 2021099622 | A1 | 5/2021 |
| WO | 2021198406 | A1 | 10/2021 |
| WO | 2021198407 | A1 | 10/2021 |

OTHER PUBLICATIONS

Abdeldjalil Aissa-El-Bey et al. "Sparsity-Based Recovery of Finite Alphabet Solutions to Underdetermined Linear Systems", IEEE, Transactions on Information Theory, vol. 61, Nr. 4; Apr. 4, 2015; pp. 2008-2018.

Hikori Iimori et al. "Discreteness-aware Receivers for Overloaded MIMO Systems", 13 Pages, 2020.

Hikori Iimori et al. "MIMO Beamforming Schemes for Hybrid SIC FD Radios With Imperfect Hardware and CSI", IEEE Transactions on Wireless Communications, vol. 18, No. 10., Oct. 2019.

Kai-Kit Wong et al. "Efficient High-Performance Decoding for Overloaded MIMO Antenna Systems", IEEE Transactions on Wireless Communications, vol. 6, No. 5, May 2007; Authorized licensed use limited to: University of Electro Communications. Downloaded on Mar. 19, 2020 at 12:40:19 UTC from IEEE Xplore. Restrictions apply.

Ryu Hayakawa et al. "Convex Optimization-Based Signal Detection for Massive Overloaded MIMO Systems", IEEE Transactions on Wireless Communications, vol. 16, No. 11; Nov. 2017; pp. 7080-7091.

(56) References Cited

OTHER PUBLICATIONS

D. Saffar et al. "Behavioral Modeling of MIMO Transmitters Exhibiting Nonlinear Distortion and Hardware Impairements", Proceedings of the 6th European Microwave Integrated Circuits Conference, Manchester, UK, 2011.
Chen Qian et al. "Two-Stage List Sphere Decoding for Under-Determined Multiple-Input Multiple-Output Systems", IEEE Transactions on Wireless Communications, vol. 12, No. 12, Dec. 2013.
Hikori Iimori et al. "Joint Detection in Massive Overloaded Wireless System via Mixed-Norm Discrete Vector Decoding", IEEE 2020; 6 pages.
Qian Cheng et al. "Resource Allocation for Device-to-device Aided Cooperative NOMA with Imperfect CSI", This work was supported by National Key R&D Program of China (Grant No. 2017YFB080193).
Hwanjin Kim et al. "Channel Estimation for Spatially/Temporally Correlated Massive MIMO Systems with One-Bit ADCs", 2019, This paper was presented in part at the IEEE Global Communicatons ,2018.
Ryu Hayakawa et al. "Reconstruction of Complex Discrete-Valued Vector via Convex Optimization With Sparse Regularizers", IEEE Access, vol. 6, Oct. 31, 2018; pp. 66499-66512.
Tanumay Datta et al. "Low-Complexity Near-Optimal Signal Detection in Underdetermined Large-MIMO Systems", IEEE 2012; 5 pages, ISBN: 987-1-4673-0816-8.
Ryu Hayakawa et al. "An Overloaded MIMO Signal Detection Scheme with Slab Decoding and Lattice Reduction", Proceedings of APCC2015 copyright © 2015 IEICE 14 SB 0087.
G.D. Golden et al. "Detection algorithm and initial laboratory results using V-BLAST space-time communication architecture", Electronics Letters Jan. 7, 1999 vol. 35 No. I Authorized licensed use limited to: University of Electro Communications. Downloaded on Mar. 19, 2020 at 12:41:26 UTC from IEEE Xplore. Restrictions apply.
Tianbin Wo et al. "A Simple Iterative Gaussian Detector for Severely Delay-Spread MIMO Channels", This full text paper was peer reviewed at the direction of IEEE Communications Society subject matter experts for publication in the ICC 2007 proceedings. S. 4598 bis S. 4603 1-4244-0353-7/07/$25.00 ©2007 IEEE.
Zahran Hajji et al. "Simplicity-based recovery of finite-alphabet signals for large-scale MIMO systems", Elsevier, 2018, 80, pp. 70-82, HAL Id: hal-01811519 https://hal.archives-ouvertes.fr/hal-01811519.
Medhi Barzegar Khalilsarai et al. "FDD Massive MIMO via UL/DL Channel Covariance Extrapolation and Active Channel Sparsification", IEEE Transactions on Wireless Communications., vol. 18, No. 1, Jan. 2019.
Yasser Fadlallah et al. "New Iterative Detector of MIMO Transmission Using Sparse Decomposition", IEEE Transactions on Vehicular Technology; vol. 64 No. 8; Aug. 2015; pp. 3458-3464.
Masaaki Nagahara "Discrete Signal Reconstruction by Sum of Absolute Values", IEEE Signal Processing Letters, vol. 22, No. 10, Oct. 2015.
Kaiming Shen et al. "Fractional Programming for Communication Systems—Part I: Power Control and Beamforming", IEEE Transactions on Signal Processing, vol. 66, No. 10, May 15, 2018, pp. 2616-2630.
De Mi et al. "Massive MIMO Performance With Imperfect Channel Reciprocity and Channel Estimation Error", IEEE Transactions on Communications, vol. 65, No. 9, Sep. 2017.
Mohamed A. Suliman et al. "SNR Estimation in Linear Systems with Gaussian Matrices", IEEE Signal Processing Letters, vol. 24, No. 12, Dec. 2017.
G.E. Prescott et al. "Adaptive Estimation of Transmission Distortion in a Digital Communications Channel", IEEE Transactions on Communications, vol. 36, No. 9, Sep. 1988.
International Search Report and Written Opinion dated Jul. 1, 2021 from corresponding International patent application No. PCT/EP2021/058578.
Hiroki Limori et al. "Design of Discretness-Aware Linear MMSE Filter", The 42nd Symposium on Information Theory and its Applications (SITA2019), Nov. 26-29, 2019, Kirishima, Kagoshima, Japan, pp. 581-586.
Deng Chao et al. "Performance analysis of relaying networks based on non-orthogonal multiple access", 2019 Journal of University of Science and Technology of China, Jul. 2019, vol. 49, No. 7, China Academic Journal Electronic Publishing House.
Yu Wu et al. "Efficient Channel Estimation for mmWave MIMO with Transceiver Hardware Impairments", IEEE Transactions on Vehicle Technology, 2019, IEEE.
Gang Yang et al. "A novel Ultra-wideband weighted ATR receiver based on MMSE estimation for localization applications", Proceedings of the 2011 IEEE International Conference on Cyber Technology in Automation, Control, and Intelligent Systems Mar. 20-23, 2011, IEEE, Kunming, China.
Jiang Xiaolin "Multiuser Detection Algorithm in the Direction of Noise Enhanced Subspace in Massive MIMO Systems", (Dissertation for the Master Degree in Engineering), 2015, China Academic Journal Electronic Publishing House.
Zhang Xianyu et al. "Ultra Wide-Band Channel Estimation and Signal Detection Through Compressed Sensing", Journal of Xi'an Jiaotong University, Feb. 2010,vol. 44, No. 2, China Academic Journal Electronic Publishing House.
Hiroki Iimori Et A. "Robust Transmit Beamforming Design via Fractional Programming for Downloads Power-Domain Noma Systems", IEICE Technical Report, IEEE, Jul. 3, 2019, vol. 119, No. 106, pp. 27-32.
Office Action dated Aug. 31, 2023 from related Chinese patent application No. 202180025535.2.
Office Action dated Sep. 12, 2023 from related Chinese patent application No. 202180025498.5.
Office Action dated Oct. 24, 2023 from related Japanese patent application No. 2022-560346.
Notice of Reasons for Refusal dated Oct. 24, 2023 from related Japanese patent application No. 2022-560345.
Notice of Reasons for Refusal dated Oct. 24, 2023 from corresponding Japanese patent application No. 2022-560336.
Jin et al., "Resolution and Reconstruction of an Algorithm by a Modified Mobius Transformation in Signal Processing", 2009 Fifth International Joint Conference on INC, IMS and IDC, Date of Conference: Aug. 25-27, 2009, Date of Conference: Aug. 25-27, 2009, DOI: 10.1109/NCM.2009.317.
European Examination Report dated Dec. 12, 2024 for the counterpart European Patent Application No. 21 716 689.1.
Notice of Refusal dated Nov. 19, 2024 for the counterpart Japanese Application No. 2022-560336 and machine translation of same.
European Examination Report dated Nov. 7, 2024 for the related European Patent Application No. 20 812 242.4.
European Examination Report dated Nov. 5, 2024 for the related European Patent Application No. 21 716 690.9.
European Examination Report dated Nov. 5, 2024 for the related European Patent Application No. 21 716 691.7.
Ryo Hayakawa et al. / Convex Optimization-Based Signal Detection for Massive Overloaded MIMO Systems. Nov. 9, 2017—IEEE Trans. Wireless Commun., vol. 16, No. 11, pp. 7080-7091.
Notice of Allowance dated Sep. 5, 2023 of counterpart U.S. Appl. No. 17/916,640.
Korean Office Action dated Aug. 31, 2023 of counterpart Korean Application 10-2022-7033311.
Korean Office Action dated Aug. 31, 2023 for related Korean Application 10-2022-7033312.
Korean Office Action dated Aug. 31, 2023 for related Korean Application 10-2022-7033310.
Charles Jeon/ Data Detection in Massive MU-MIMO Systems / 01.05.2019.
Chinese Office Action dated Aug. 18, 2023 of counterpart Chinese Application 202180025534.8.
Stephen Boyd et al. "Convex Optimization", 2004, pp. 67-125, Cambridge University Press.
Yasser Fadlallah et al., "New Iterative Detector of MIMO Transmission Using Sparse Decomposition", IEEE Transactions on Vehicu-

(56) References Cited

OTHER PUBLICATIONS lar Technology ( vol. 64, Issue: 8, Aug. 2015), pp. 3458-3464, DOI: 10.1109/TVT.2014.236068. 2019Q03868.
Razvan-Andrei Stoica et al., "Massively Concurrent NOMA: A Frame-Theoretic Design for Non-Orthogonal Multiple Access", 2018 52nd Asilomar Conference on Signals, Systems, and Computers, Date of Conference: Oct. 28-31, 2018, DOI: 10.1109/ACSSC.2018.8645146. 2019Q03870.
El Gheche et al., "Proximal splitting methods for depth estimation", 2011 IEEE International Conference on Acoustics, Speech and Signal Processing (ICASSP), Date of Conference: May 22-27, 2011, DOI: 10.1109/ICASSP.2011.5946538. 2022Q06003.
Razan-Andrei Stoica et al., "Sparsely-structured Multiuser Detection for Large Massively Concurrent NOMA Systems", 2019 53rd Asilomar Conference on Signals, Systems, and Computers, Date of Conference: Nov. 3-6, 2019, DOI: 10.1109/IEEECONF44664.2019.9048777. 2021Q01712.
Tanumay Datta et al., "Low-Complexity Near-Optimal Signal Detection in Underdetermined Large-MIMO Systems", 2012 National Conference on Communications (NCC), Date of Conference: Feb. 3-5, 2012, DOI: 10.1109/NCC.2012.6176823. 2019Q03869.
Patrick L Combettes et al, "Proximal Splitting Methods in Signal Processing", May 18, 2010, https://doi.org/10.48550/arXiv.0912.3522. 2022Q02063.
Razvan-Andrei Stoica et al., "A low-complexity Receiver for Massively Concurrent Non-orthogonal Multiple Access", 2019 IEEE 20th International Workshop on Signal Processing Advances in Wireless Communications (SPAWC), Date of Conference: Jul. 2-5, 2019, DOI: 10.1109/SPAWC.2019.8815592. 2023Q02449.
Takumi Takahashi et al, "Channel Estimation Using Long-term Channel Statistics for BP-based Large MIMO Detection", 2019, IEICE Technical Report, vol. 119, No. 8, pp. 76-72, 2023Q03448 and translation of Abstract.
Zhang Mei, "Research on sparse multiuser detection strategy in Non-Orthogonal multiple access system" Electronic and Communication Engineering Industrial Technology Research Institute, May 2019, 2023Q02450 and translation of same.
Zhao Xiaojuan et al., "Multi-user detection in NOMA system based on structured compressed sensing", 2023Q02451 and translation of same.
R Hayakawa et al., "An overloaded MIMO signal detection scheme with slab decoding and lattice reduction", 2015 21st Asia-Pacific Conference on Communications (APCC), Date of Conference: Oct. 14-16, 2015, DOI: 10.1109/APCC.2015.7412549. 2023Q05899.
Razvan-Andrie Stoica et al., "Frame Theory and Fractional Programming for Sparse Recovery-Based mmWave Channel Estimation", IEEE Access ( vol. 7), pp. 150757-150774, Date of Publication: Oct. 14, 2019, DOI: 10.1109/ACCESS.2019.2947012. 2020Q03941.
Razvan-Andrie Stoica et al., "Massively Concurrent Non-Orthogonal Multiple Access for 5G Networks and Beyond", IEEE Access ( vol. 7), pp. 82080-82100, 2022Q06021.
Notice of Reasons for Refusal drafted Apr. 18, 2024 for the counterpart Japanese Patent Application No. 2022-560336 and machine translation of same.
Chinese Notice of Allowance dated May b2, 2024 for the counterpart Chinese Patent Application No. 202180025534.8 and machine translation of same.
Selim et al. "Performance Analysis of Non-Orthogonal Multiple Access Under I/Q Imbalance", IEEE Access, vol. 6, pp. 18453-18468, IEEE, doi: 10.1109/ACCESS.2018.2820074., (Apr. 23, 2018).
Written Decision on Registration issued on May 19, 2025 from corresponding Korean patent application No. 10-2022-7033310.
Written Decision on Registration issued on Apr. 22, 2025 from related Korean patent application No. 10-2022-7033311.
Written Decision on Registration issued on Apr. 22, 2025 from related Korean patent application No. 10-2022-7033312.
Non-Final Office Action mailed Oct. 29, 2025 from related U.S. Appl. No. 17/778,703.
Communication under Rule 71(3) dated Feb. 19, 2026 for the cross-referenced European Patent Application No. 19 797 638.4.
European Examination Report dated Mar. 26, 2026 for the cross-referenced European Patent Application No. 19 797 638.4.

* cited by examiner

ESTIMATION METHOD OF DISCRETE DIGITAL SIGNALS IN NOISY OVERLOADED WIRELESS COMMUNICATION SYSTEMS WITH CSI ERRORS

FIELD

The present invention relates to the field of digital wireless systems in overloaded scenarios, addressing a problem of estimating symbols sampled from a discrete digital signaling alphabet (e.g., constellation) in noisy environments assuming non-ideal channel state information.

BACKGROUND

Since Shannon developed the Shannon-Weaver communication model, embedding informative bits into discrete alphabets (e.g., constellation, index, codebook) has been an indispensable feature of feasible signal processing systems. In response to the ever-larger demand for high-data-rate and because of the trend to operate wireless systems in higher frequency bands (for which transceivers employ larger numbers of antennas), such discrete-alphabet systems are rapidly scaling up, making large-dimensional discrete signal detection problems more relevant than ever before. Moreover, the rapid growth in the number of wirelessly-connected communication devices seen recently imply the necessity that receivers of future wireless systems can deal with underdetermined system conditions.

The expressions "resource overloading" or "overloaded communication channel" typically refers to a communication channel that is concurrently used by several users, or transmitters (T) whose number $N_T$ is larger than the number $N_R$ of receivers (R). At receiver side, the multiplicity of transmitted signals will appear as one superimposed signal. The channel may also be overloaded by a single transmitter that transmits a superposition of symbols and thereby goes beyond the available channel resources in a "traditional" orthogonal transmission scheme. The "overloading" thus occurs in comparison to schemes, in which a single transmitter has exclusive access to the channel, e.g., during a time slot or the like, as found in orthogonal transmission schemes. Overloaded channels may be found, e.g., in wireless communication systems using Non-Orthogonal Multiple Access (NOMA) and underdetermined Multiple-Input Multiple-Output (MIMO) channels.

C. Qian, J. Wu, Y. R. Zheng, and Z. Wang in "Two-stage list sphere decoding for under-determined multiple-input multiple-output systems," IEEE Transactions on Wireless Communication, vol. 12, no. 12, pp. 6476-6487, 2013 a two-stage list sphere decoding (LSD) algorithm is proposed for under-determined multiple-input multiple-output (UD-MIMO) systems that employ N transmit antennas and M<;N receive antennas. The two-stage LSD algorithm exploits the unique structure of UD-MIMO systems by dividing the N detection layers into two groups. Group 1 contains layers 1 to M that have similar structures as a symmetric MIMO system; while Group 2 contains layers M+1 to N that contribute to the rank deficiency of the channel Gram matrix. Tree search algorithms are used for both groups, but with different search radii. A new method is proposed to adaptively adjust the tree search radius of Group 2 based on the statistical properties of the received signals. The employment of the adaptive tree search can significantly reduce the computation complexity. We also propose a modified channel Gram matrix to combat the rank deficiency problem, and it provides better performance than the generalized Gram matrix used in the Generalized Sphere-Decoding (GSD) algorithm. Simulation results show that the proposed two-stage LSD algorithm can reduce the complexity by one to two orders of magnitude with less than 0.1 dB degradation in the Bit-Error-Rate (BER) performance. This reference will be used as reference [1] in this description of the application.

R. Hayakawa, K. Hayashi, and M. Kaneko in "An overloaded MIMO signal detection scheme with slab decoding and lattice reduction," Proceedings APCC, Kyoto, Japan, October 2015, pp. 1-5 proposes a reduced complexity signal detection scheme for overloaded MIMO (Multiple-Input Multiple-Output) systems. The proposed scheme firstly divides the transmitted signals into two parts, the post-voting vector containing the same number of signal elements as of receive antennas, and the pre-voting vector containing the remaining elements. Secondly, it uses slab decoding to reduce the solution candidates of the pre-voting vector and determines the post-voting vectors for each pre-voting vector candidate by lattice reduction aided MMSE (Minimum Mean Square Error)-SIC (Successive Interference Cancellation) detection. Simulation results show that the proposed scheme can achieve almost the same performance as the optimal ML (Maximum Likelihood) detection while drastically reducing the required computational complexity. This reference will be used as reference [2] in this description of the application.

T. Datta, N. Srinidhi, A. Chockalingam, and B. S. Rajan, "Low complexity near-optimal signal detection in underdetermined large MIMO systems," in Proc. NCC, February 2012, pp. 1-5 is considered signal detection in $n_t{\times}n_r$ underdetermined MIMO (UD-MIMO) systems, where i) $n_t{>}n_r$ with a overload factor $\alpha{=}n_t\ n_r{>}1$, ii) $n_t$ symbols are transmitted per channel use through spatial multiplexing, and iii) $n_t$, $n_r$ are large (in the range of tens). A low-complexity detection algorithm based on reactive tabu search is considered. A variable threshold based stopping criterion is proposed which offers near-optimal performance in large UD-MIMO systems at low complexities. A lower bound on the maximum likelihood (ML) bit error performance of large UD-MIMO systems is also obtained for comparison. The proposed algorithm is shown to achieve BER performance close to the ML lower bound within 0.6 dB at an uncoded BER of 10-2 in 16×8 V-BLAST UD-MIMO system with 4-QAM (32 bps/Hz). Similar near-ML performance results are shown for 32×16, 32×24 V-BLAST UD-MIMO with 4-QAM/16-QAM as well. A performance and complexity comparison between the proposed algorithm and the X-generalized sphere decoder (X-GSD) algorithm for UD-MIMO shows that the proposed algorithm achieves almost the same performance of X-GSD but at a significantly lesser complexity. This reference will be used as reference [3] in this description of the application.

Y. Fadlallah, A. Aïssa-El-Bey, K. Amis, D. Pastor and R. Pyndiah, "New Iterative Detector of MIMO Transmission Using Sparse Decomposition," IEEE Transactions on Vehicular Technology, vol. 64, no. 8, pp. 3458-3464, August 2015 addresses the problem of decoding in large-scale multiple-input-multiple-output (MIMO) systems. In this case, the optimal maximum-likelihood (ML) detector becomes impractical due to an exponential increase in the complexity with the signal and the constellation dimensions. This paper introduces an iterative decoding strategy with a tolerable complexity order. It is consider a MIMO system with finite constellation and model it as a system with sparse signal sources. It is propose an ML relaxed detector that minimizes the Euclidean distance with the received signal while preserving a constant 1-norm of the decoded signal. It is also showed that the detection problem is equivalent to a convex optimization problem, which is solvable in polynomial time. This reference will be used as reference [4] in this description of the application.

T. Wo and P. A. Hoeher, "A simple iterative gaussian detector for severely delay-spread MIMO channels," in Proc. IEEE ICC, Glasgow, U K, 2007 describe in this paper, a low-complexity high-performance detection algorithm for multiple input multiple output (MIMO) channels with severe delay spread is proposed. This algorithm performs iterative data detection over factor graphs which apply an independence approximation as well as a Gaussian approximation. It is shown that this algorithm achieves a near-optimum BER performance for coded MIMO systems with severe delay spread. The computational complexity of this algorithm is strictly linear in the number of transmit antennas, the number of receive antennas, and the number of non-zero channel coefficients. This reference will be used as reference [5] in this description of the application.

A. Aïssa-El-Bey, D. Pastor, S. M. A. Sbaï, and Y. Fadlallah, "Sparsity-based recovery of finite alphabet solutions to underdetermined linear systems," IEEE Trans. Inf. Theory, vol. 61, no. 4, pp. 2008-2018, April 2015 describe the problem of estimating a deterministic finite alphabet vector f from underdetermined measurements y=A f, where A is a given (random) n×N matrix is described. Two convex optimization methods are introduced for the recovery of finite alphabet signals via 1-norm minimization. The first method is based on regularization. In the second approach, the problem is formulated as the recovery of sparse signals after a suitable sparse transform. The regularization based method is less complex than the transform-based one. When the alphabet size p equals 2 and (n, N) grows proportionally, the conditions under which the signal will be recovered with high probability are the same for the two methods. When p>2, the behavior of the transform-based method is established. This reference will be used as reference [6] in this description of the application.

M. Nagahara, "Discrete signal reconstruction by sum of absolute values," IEEE Signal Process. Lett., vol. 22, no. 10, pp. 1575-1579, October 2015 it is considered a problem of reconstructing an unknown discrete signal taking values in a finite alphabet from incomplete linear measurements. The difficulty of this problem is that the computational complexity of the reconstruction is exponential as it is. To overcome this difficulty, it is extend the idea of compressed sensing, and propose to solve the problem by minimizing the sum of weighted absolute values. It is assume that the probability distribution defined on an alphabet is known, and formulate the reconstruction problem as linear programming. Examples are shown to illustrate that the proposed method is effective. This reference will be used as reference [7] in this description of the application.

R. Hayakawa and K. Hayashi, "Convex optimization-based signal detection for massive overloaded MIMO systems," IEEE Trans. Wireless Commun., vol. 16, no. 11, pp. 7080-7091, November 2017 proposes signal detection schemes for massive multiple-input multiple-output (MIMO) systems, where the number of receive antennas is less than that of transmitted streams. Assuming practical baseband digital modulation, and taking advantage of the discreteness of transmitted symbols, it is formulated the signal detection problem as a convex optimization problem, called sum-of-absolute-value (SOAV) optimization. Moreover, we extend the SOAV optimization into the weighted-SOAV (W-SOAV) optimization and propose an iterative approach to solve the W-SOAV optimization with updating the weights in the objective function. Furthermore, for coded MIMO systems, we also propose a joint detection and decoding scheme, where log likelihood ratios (LLRs) of transmitted symbols are iteratively updated between the MIMO detector and the channel decoder. In addition, a theoretical performance analysis is provided in terms of the upper bound of the size of the estimation error obtained with the W-SOAV optimization. Simulation results show that the bit error rate (BER) performance of the proposed scheme is better than that of conventional schemes, especially in large-scale overloaded MIMO systems. This reference will be used as reference [8] in this description of the application.

R. Hayakawa and K. Hayashi, "Reconstruction of complex discrete-valued vector via convex optimization with sparse regularizers," IEEE Access, vol. 6, pp. 66 499-66 512, October 2018 proposes signal detection schemes for massive multiple-input multiple-output (MIMO) systems, where the number of receive antennas is less than that of transmitted streams. Assuming practical baseband digital modulation and taking advantage of the discreteness of transmitted symbols, the signal detection problem is formulated as a convex optimization problem, called sum-of-absolute-value (SOAV) optimization. Moreover, extend the SOAV optimization into the weighted SOAV (W-SOAV) optimization is extended and propose an iterative approach to solve the W-SOAV optimization with updating the weights in the objective function. Furthermore, for coded MIMO systems, a joint detection and decoding scheme is proposed, where log likelihood ratios of transmitted symbols are iteratively updated between the MIMO detector and the channel decoder. In addition, a theoretical performance analysis is provided in terms of the upper bound of the size of the estimation error obtained with the W-SOAV optimization. This reference will be used as reference [9] in this description of the application.

Z. Hajji, A. Aissa-El-Bey, and K. A. Cavalec, "Simplicity-based recovery of finite-alphabet signals for large-scale MIMO systems," Digital Signal Process., vol. 80, pp. 70-82, 2018 in this paper, the problem of finite-alphabet source separation in both determined and underdetermined large-scale systems is considered. First, we address the noiseless case and we propose a linear criterion based on $l_1$-minimization combined with box constraints. We investigate also the system conditions that ensure successful recovery. Next, we apply the approach to the noisy massive MIMO transmission and we propose a quadratic criterion-based detector. Simulation results show the efficiency of the proposed detection methods for various QAM modulations and MIMO configurations. We mention that there is no change in the computational complexity when the constellation size increases. Moreover, the proposed method outperforms the classical Minimum Mean Square Error (MMSE)-based detection algorithms. This reference will be used as reference [10] in this description of the application.

H. Iimori, G. Abreu, D. Gonzaléz G., and O. Gonsa, "Joint detection in massive overloaded wireless systems via mixed-norm discrete vector decoding," in Proc. Asilomar CSSC, Pacific Grove, USA, 2019 propose a novel '$l_0$-norm based multi dimensional signal detection scheme for overloaded wireless systems such as Non-orthogonal Multiple Access (NOMA) and underdetermined Multiple-Input Multiple-Output (MIMO), in which the discreteness of maximum likelihood (ML) detection is transformed into a continuous $l_0$-norm constraint, subsequently convexized via fractional programming (FP). As a consequence, the proposed signal detection algorithm possesses the potential to achieve ML-like performance in terms of bit error rate (BER) by properly adjusting weighting parameters, at a fraction of the cost. Simulation comparisons with state-of-the-art (SotA) alternatives are given, which illustrate the effectiveness of the proposed method both in terms of its capability of outperforming the SotA and of possibilities of further improvement towards ML-like performance via the optimization of the weighting parameters. This reference will be used as reference [11] in this description of the application.

H. Iimori, R.-A. Stoica, G. T. F. de Abreu, D. Gonzaléz G., A. Andrae, and O. Gonsa, "Discreteness-aware receivers for overloaded MIMO systems," CoRR, vol. abs/2001.07560, 2020. [Online]. Available: https://arxiv.org/abs/2001.07560 describe three high-performance receivers suitable for symbol detection of large-scaled and overloaded multidimensional wireless communication systems, which are designed upon the usual perfect channel state information (CSI) assumption at the receiver. Using this common assumption, the maximum likelihood (ML) detection problem is first formulated in terms of an '0-norm-based optimization problem, subsequently transformed using a recently-proposed fractional programming (FP) technique referred to as quadratic transform (QT), in which the $l_0$-norm is not relaxed into an $l_1$-norm, in three distinct ways so as to offer a different performance-complexity tradeoff. The first algorithm, dubbed the discreteness-aware penalized zero-forcing (DAPZF) receiver, aims at outperforming state-of-thearts (SotAs) while minimizing the computational complexity. The second solution, referred to as the discreteness-aware probabilistic soft-quantization detector (DAPSD), is designed to improve the recovery performance via a soft-quantization method, and is found via numerical simulations to achieve the best performance of the three. Finally, the third scheme, named the discreteness aware generalized eigenvalue detector (DAGED), not only offers a trade-off between performance and complexity compared to the others, but also differs from them by not requiring a penalization parameter to be optimized offline. Simulation results demonstrate that all three methods outperform the state-of-the-art receivers, with the DAPZF exhibiting significantly lower complexity. This reference will be used as reference [12] in this description of the application.

Boyd, S., & Vandenberghe, L. (2004). *Convex Optimization*. Cambridge: Cambridge University Press. doi:10.1017/CBO9780511804441 describes the theoretical basis for the convex optimization as a lecture book. This reference will be used as reference [13] in this description of the application.

K. Shen and W. Yu in "Fractional programming for communication systems—Part I: Power control and beamforming," IEEE Trans. Signal Process., vol. 66, no. 10, pp. 2616-2630, May 2018 explores the use of FP in the design and optimization of communication systems. Part I of this paper focuses on FP theory and on solving continuous problems. The main theoretical contribution is a novel quadratic transform technique for tackling the multiple-ratio concave-convex FP problem—in contrast to conventional FP techniques that mostly can only deal with the single-ratio or the max-min-ratio case. Multiple-ratio FP problems are important for the optimization of communication networks, because system-level design often involves multiple signal-to-interference-plus-noise ratio terms. This paper considers the applications of FP to solving continuous problems in communication system design, particularly for power control, beamforming, and energy efficiency maximization. These application cases illustrate that the proposed quadratic transform can greatly facilitate the optimization involving ratios by recasting the original nonconvex problem as a sequence of convex problems. This FP-based problem reformulation gives rise to an efficient iterative optimization algorithm with provable convergence to a stationary point. This reference will be used as reference [14] in this description of the application.

Kai-Kit Wong, Member and Arogyaswami Paulraj in "Efficient High-Performance Decoding for Overloaded MIMO Antenna Systems" IEEE TRANSACTIONS ON WIRELESS COMMUNICATIONS, VOL. 6, NO. 5, May 2007 describe that, the practical challenge of capacity-achieving forward error-correcting codes (e.g., space-time Turbo codes) is overcoming the tremendous complexity associated by their optimal joint maximum-likelihood (ML) decoding. For this reason, iterative soft decoding has been studied to approach the optimal ML decoding performance at affordable complexity. In multipleinput multiple-output (MIMO) channels, a judicious decoding strategy consists of two stages: 1) estimate the soft bits using list version of sphere decoding or its variants, and 2) update the soft bits through iterative soft decoding. A MIMO decoder is required to produce reliable soft-bit estimates at the first stage before iterative soft decoding is performed. In this paper, the focus is on the overloaded (or fat) MIMO antenna systems where the number of receive antennas is less than the number of signals multiplexed in the spatial domain. In this scenario, the original form of sphere decoding is inherently not applicable and our aim is to generalize sphere decoding geometrically to cope with overloaded detection. The so-called slab-sphere decoding (SSD) proposed guarantees to obtain exactML hard detection while reducing complexity greatly. With the list-version of SSD, this paper proposes an efficient MIMO soft decoder, which can generate reliable soft-bit estimates at affordable complexity as inputs for iterative soft decoding for promising performance. This reference will be used as reference [15] in this description of the application.

G. D. Golden, C. J. Foschini, R. A. Valenzuela and P. W. Wolniansky in "Detection algorithm and initial laboratory results using V-BLAST space-time communication architecture" ELECTRONICS LETTERS 7th January 7999 Vol. 35 No. I the signal detection algorithm of the vertical BLAST (Bell Laboratories Layered Space-Time) wireless communications architecture is described. Using this joint space-time approach, spectral efficiencies ranging from 20-40 bit/s/Hz have been demonstrated in the laboratoly under flat fading conditions at indoor fading rates. Recent information theory research has shown that the rich-scattering wireless channel is capable of enormous theoretical capacities if the multipath is properly exploited. The diagonally-layered space-time architecture proposed by Foschini, now known as D-BLAST, uses multielement antenna arrays at both transmitter and receiver and an elegant diagonally-layered coding structure in which code blocks are dispersed across diagonals in space-time. In an independent Rayleigh scattering environment, this processing structure leads to theoretical rates which grow linearly with the number of transmit antennas, with these rates approaching 90% of Shannon capacity. However, the diagonal approach suffers from certain implementation complexities which make it inappropriate for initial implementation. It is described a simplified version of the BLAST detection algorithm, known as vertical BLAST, or V-BLAST, which has been implemented in realtime in the laboratory. Using our laboratory prototype, we have demonstrated spectral efficiencies as high as 40 bit/s/Hz in an indoor slow-fading environment. This reference will be used as reference [16] in this description of the application.

FIGS. 1 and 2 illustrate basic properties of orthogonal multiple access and non-orthogonal multiple access, respectively. FIG. 1 shows one exemplary embodiment of the ordered access of transmit resources to channels of a shared transmission medium, e.g., in a wireless communication system. The available frequency band is split into several channels. A single channel or a combination of contiguous or non-contiguous channels may be used by any one transmitter at a time. Different transmitters, indicated by the different hashing patterns, may transmit in discrete time slots or in several subsequent timeslots and may change the channels or combination of channels in which they transmit for each transmission. Note that, as shown in FIG. 1, any transmitter may use one channel resource over a longer period, while another transmitter may use two or more channel resources simultaneously, and yet another transmitter may to both, using two or more channel resources over a longer period of time. In any case, only one transmitter uses any channel resource or combination thereof at a time, and it is relatively easy to detect and decode signals from each transmitter.

FIG. 2*a* shows the same frequency band as shown in FIG. 1, but there may not always be a temporary exclusive assignment of one or more individual channels to a transmitter. Rather, at least a portion of the frequency band may concurrently be used by a plurality of transmitters, and it is much more difficult to detect and decode signals from individual transmitters. This is indicated by the boxes of different hashing. While, beginning from the left, at first three transmitters use temporary exclusive channel resources in an orthogonal manner, in the next moment two transmitters transmit in channels that partially overlap. The transmitter represented by the horizontal hashing pattern has exclusive access to the channel shown at the bottom of the figure, while the next three channels used by this transmitter are also used by another transmitter, represented by diagonal hashing pattern in the dashed-line oval. The superposition is indicated by the diagonally crossed hashing pattern. A similar situation occurs in the following moment, where each of two transmitters exclusively uses two channel resources, while both share a third one. It must be noted that more than two transmitters may at least temporarily share some or all the channel resources. These situations may be called partial-overloading, or partial-NOMA. In a different representation, FIG. 2*b* shows the same frequency band as FIG. 2. Since there is no clear temporary exclusive assignment of one or more individual channels to a transmitter, and at least a portion of the frequency band is at least temporarily concurrently used by a plurality of transmitters, the difficulty to detect and decode signals from individual transmitters is indicated by the grey filling pattern that does not allow for identifying any single transmitter.

Multidimensional discrete signal detection problems also arise in various areas of modern electrical engineering related to signal processing, including audio and video systems, communication systems, control systems and more. In general, the aim is to extract out of a limited number of observed measurements of a signal subjected to random distortion, noise and interference, informative quantities (symbols) which albeit random (unknown), are generated from sources according to a systematic model (coding book, constellation, etc.) known to the receiver.

One of the principal issues of such large and possibly underdetermined systems is performance-complexity tradeoff Indeed, on the one hand the ML receiver and its classic near-optimal alternatives such as sphere decoders [1,2] suffer from prohibitive computational complexity which grow exponentially with the number of input variables and the cardinality of the source's constellation, causing combinatorial formulations of the problem to become intractable even for relatively small settings. On the other hand, conventional low-complexity linear estimators (i.e., zero-forcing (ZF) and minimum mean square error (MMSE)) are associated with severe bit error rate (BER) performance degradation in underdetermined cases. Although several low-complexity counterparts have been proposed in the past [3-5], one can find their limitations on either scalability due to relatively high computational complexity or performance due to moderate detection capability.

Recently, much progress has been made in this area thanks to the introduction of compressed sensing (CS) methods, which in the context of multidimensional discrete signal detection lead to a novel finite-alphabet signal regularization technique solvable in polynomial time, which is proposed by [6,7]. To elaborate, the core idea of this new concept, referred to as discreteness-awareness, is to bias the search of likely signals towards the discrete constellation set using techniques which emerged recently out of CS methods, while maintaining the continuity of the search space so as to retain convexity and thus allow for optimum solutions to be obtained efficiently.

In this context, discreteness-aware receiver designs have been pursued in several recent articles. In [6,7], for instance, new sparsity-based recovery methods for noise free underdetermined linear systems has been proposed, which demonstrates the feasibility of discrete signal recovery even in severely overloaded massive systems.

In order to take into account the effect of the noise on decoding performance at the receiver [8-10] have developed novel discreteness-aware receivers, dubbed as sum-of-absolute-value (SOAV), sum of complex sparse regularizers (SCSR) and simplicity-based recovery (SBR), respectively, which have been shown to significantly outperform not only the conventional linear ZF and MMSE estimators but also previous state-of-the-arts (SotAs) including the graph-based iterative Gaussian detector (GIGD) [5], the Quad-min [4] and the enhanced reactive tabu search (ERTS) [3]. However, the latter approaches have relied on the well-known $l_1$-norm approximation to replace the $l_0$-norm non-convex function appeared in the original discreteness-aware receiver to capture the discreteness of the input signal, indicating the possibility to improve the detection performance.

Aiming to tackle this challenge, the authors in [11,12] have developed a new type of discreteness-aware receivers without resorting to the usual convex hull relaxation, which have demonstrated that the proposed methods not only outperform the other SotAs (i.e., SOAV, SCSR and SBR) but also approach the theoretical performance bound. Their key ingredients are two-fold: the adaptable $l_0$-norm approximation and fractional programming (FP), which cast the intractable $l_0$-norm minimization into sequence of convex problems, tightening the approximation gap.

Although it has been shown in [12] that the new discreteness-aware receiver, referred to as discreteness-aware penalized zero-forcing (DAPZF), significantly outperformed other SotA discreteness-aware detectors, i.e., SOAV, SCSR and SBR referred above, which indicates that DAPZF is a novelty resulting in better performance (as it is shown in FIG. 4), it has also assumed that ideal/perfect channel state information (CSI) knowledge is available at the receiver. However, the performance of signal detection algorithms for multidimensional wireless systems is indeed limited by these unavoidable errors.

Such imperfection needs therefore to be modeled and incorporated in the design of signal detection algorithms to suppress the associated undesired impacts. All in all, to the best of our knowledge, a discreteness-aware multidimensional signal detection mechanism, which is not only independent from the channel structure in terms of convergence but also fully considering CSI imperfection in its signal reconstruction procedure, has not yet been proposed.

Thus, the present invention addresses the CSI uncertainty problem in digital signal recovery, that of providing a method for estimating transmit discrete symbol vectors under noisy environments and the presence of CSI errors, particularly in overloaded communication channels.

BRIEF SUMMARY

The invention recognized that, since the symbols used in digital communications are ultimately transmitted as analogue signals in the analogue, i.e., continuous domain, and attenuation, intermodulation, distortion and all kinds of errors are unavoidably modifying the signals on their way from the transmitter through the analogue communication channel to the receiver, the "detection" of the transmitted symbol in the receiver remains foremost an "estimation" of the transmitted signal, irrespective of the method used. Signals are in most of cases represented by signal amplitude and signal phase, in particular to the estimation of the transmitted signal's vector. However, in the context of the present specification the terms "detecting" and "estimating" are used interchangeably, unless a distinction therebetween is indicated by the respective context. Once estimated transmitted signals are determined it is translated into an estimated transmitted symbol, and ultimately provided to a decoder that maps the estimated transmitted symbol to transmitted data bits.

All patent applications and patents mentioned in this disclosure are hereby incorporated by reference in their entireties:

PCT/EP2019/079532 with the title "Method of estimating transmit Symbol Vectors in an overloaded Communication Channel".

PCT/EP2020/082987 with the title "Method for Wireless X2X Access and Receivers for Large Multidimensional Wireless Systems".

All publications disclosed herein are incorporated by reference in their entireties, including:

H. Iimori, G. Abreu, D. Gonzaléz G., and O. Gonsa, "Joint detection in massive overloaded wireless systems via mixed-norm discrete vector decoding," in Proc. Asilomar CSSC, Pacific Grove, USA, as reference [11]

H. Iimori, R.-A. Stoica, G. T. F. de Abreu, D. Gonzaléz G., A. Andrae, and O. Gonsa, "Discreteness-aware receivers for overloaded MIMO systems," CoRR, vol. abs/2001.07560, 2020, as reference [12]

De Mi, Mehrdad Dianati, Lei Zhang, Sami Muhaidat, and Rahim Tafazolli "Massive MIMO Performance With Imperfect Channel Reciprocity and Channel Estimation Error" IEEE TRANSACTIONS ON COMMUNICATIONS, VOL. 65, NO. 9, September 2017. This paper describes how to estimate the SINR in a TDD system with channel estimation and reciprocity errors. Again, assuming that the signal's power is known (pilots), the increase in SINR due to channel estimation error can be measured.

Hwanjin Kim and Junil Choi "Channel Estimation for Spatially/Temporally Correlated Massive MIMO Systems with One-Bit ADCs" arXiv:1910.13243 9 Dec. 2019, Available 1910.13243.pdf (arxiv.org). This paper describes a method to do that in the context of resource-constrained systems (one-bit ADC).

Mahdi Barzegar Khalilsarai, Saeid Haghighatshoar, Xinping Yi, and Giuseppe Caire "FDD Massive MIMO via UL/DL Channel Covariance Extrapolation and Active Channel Sparsification" arXiv:1803.05754v2 [cs.IT] 24 Aug. 2018; Available 1803.05754.pdf (arxiv.org).

G. E. Prescott, J. L. Hammond and D. R. Hertling, "Adaptive estimation of transmission distortion in a digital communications channel," in *IEEE Transactions on Communications*, vol. 36, no. 9, pp. 1070-1073, September 1988, doi: 10.1109/26.7519.

In the context of the present specification and claims, a communication channel is characterized by a set or matrix of complex coefficients. The channel matrix may also be referred to by the capital letter H. The communication channel may be established in any suitable medium, e.g., a medium that carries electromagnetic, acoustic and/or light waves. It is assumed that the channel properties are known and constant during each symbol transmission period/time, i.e., while the channel properties may vary over time, each symbol's transmission experiences a constant channel.

The expression "symbol" refers to a member of a set of discrete symbols $c_i$, which form a constellation C of symbols or, more profane, an alphabet that is used for composing a transmission. A symbol represents one or more bits of data and represents the minimum amount of information that can be transmitted at a time in the system using constellation C. In the transmission channel a symbol may be represented by a combination of analogue states, e.g., an amplitude and a phase of a carrier wave. Amplitude and phase may, e.g., be referred to as a complex number or as ordinate values over an abscissa in the cartesian space and may be treated as a vector. A symbol's vector is referred to herein by the small letter s. Each transmitter may use the same constellation C for transmitting data. However, it is likewise possible that the transmitters use different constellations. It is assumed that the receiver has knowledge about the constellations used in the respective transmitters.

A convex function is a function [13] on which any two points on the function can be connected by a straight line that entirely stays above the function itself. The convex domain may have any dimensionality, and the inventors recognize that the idea of a straight line in a 4-or-more-dimensional domain may be difficult to visualize.

The terms "component" or "element" may be used synonymously throughout the following specification, notably when referring to vectors.

Motivated by all the above, we provide the theoretical base of the inventive detection scheme that fully incorporates the noise effect into its signal detection procedure, thus outperforming the aforementioned SotAs in terms of discrete signal detection performance.

Consider a device-to-device half-duplex communication link under a (possibly under) determined scenarios with channel estimation errors, which can be modeled as $$y = Hs + n \in \mathbb{C}^{N_r \times 1}, = \underbrace{\sqrt{1-\tau^2}\,\hat{H}x}_{Intended} + \overbrace{\tau E x}^{Int.\ due\ to\ CSI\ error} + n \tag{1}$$

where $N_t$ and $N_r$ are respectively the dimensions of the input and the output signals, such that the overloading ratio of the system is given by $$\gamma = \frac{N_t}{N_r},$$

and $\tau$ denotes the CSI estimation accuracy.

We remark the flexibility of the models described by equation (1), which allows for various levels of channel estimation imperfection to be considered by means of the Gauss-Markov uncertainty parameter $\tau$. In particular, $\tau=0$ implicates in a perfect CSI assumption, while $\tau=1$ indicates that no CSI is available at the nodes.

In the above, $H \in \mathbb{C}^{N_r \times N_t}$ is an actual channel matrix between the transceiver and the receive, $\hat{H}$ denotes the corresponding channel estimate, $E \in \mathbb{C}^{N_r \times N_t}$ is the associated channel estimation error matrix, a normalized input symbol vector consisting of elements sampled from the same constellation set $\mathcal{C}=\{c_1, \ldots c_{2b}\}$ of cardinality 2b is described as $x=[x_1, \ldots x_{N_t}]^T \in \mathbb{C}^{N_t \times 1}$ with b denoting the number of bits per symbol, and finally $n \in \mathbb{C}^{N_r \times 1}$ represents an independent and identically distributed (i.i.d.) circular symmetric circular symmetric complex AWGN vector with zero mean and covariance matrix $$\frac{N_t}{\rho} I_{N_r},$$

where $\rho$ is the fundamental signal-to-noise-ratio (SNR). SNR indicates the power ratio of the desired/transmitted signal with respect to the noise.

It will prove convenient to normalize the received signal by the scaling term $\sqrt{1-\tau^2}$, that is, $$\bar{y} = \hat{H}x + \underbrace{\frac{\tau}{\sqrt{1-\tau^2}} Ex + \frac{n}{\sqrt{1-\tau^2}}}_{\triangleq \bar{n}} \quad (2)$$

from which the covariance of f for a fixed channel can be written as $$\sum_{\bar{n}} = \frac{\tau^2}{1-\tau^2} Tr(\Phi_t)\Phi_r + \frac{\sigma_n^2}{1-\tau^2} I_{N_r} \quad (3)$$

where we assume the channel to be modeled as the classic Jakes spatial correlation that is expressed as $$H = \Phi_r^{\frac{1}{2}} H_{i.i.d.} \Phi_t^{\frac{1}{2}}$$

(4)
with $$\Phi_r^{\frac{1}{2}} \text{ and } \Phi_t^{\frac{1}{2}}$$

are the spatial correlation signatures and $H_{i.i.d}$ denotes an uncorrelated i.i.d. Gaussian matrix capturing the small fading effects.

We remark that equation (4) can express a wide range of channel matrices. For instance, uplink scenarios with widely distributed uplink users can be seen as a special case of the above, where the spatial signature matrix at the transmitter is reduced to the identity matrix $$\left(\text{i.e., } \Phi_t^{\frac{1}{2}} = I_{N_t}\right),$$

whereas in case of uncorrelated channel, $$\Phi_t^{\frac{1}{2}} = I_{N_t} \text{ and } \Phi_r^{\frac{1}{2}} = I_{N_r}.$$

Given the above, the corresponding ML detection can be readily expressed as follows.

$$\underset{x \in C^{N_t}}{\operatorname{argmin}} \|\bar{y} - \hat{H}x\|_2^2 \quad (5)$$

which can be equivalently rewritten as $$\underset{x \in \mathbb{C}^{N_t}}{\operatorname{argmin}} \|\bar{y} - \hat{H}x\|_2^2 \text{ s.t. } \sum_{i=1}^{|C|} \|x - c_i 1\|_0 = N_t \cdot (|C| - 1), \quad (6)$$

In conventional detectors a ML detection may be used for estimating a transmit signal vector for a received signal y. The ML detection requires determining the distances between the received signal vector $\bar{y}$ and all possible symbol vectors x of the symbols $c_i$ of the constellation $\mathcal{C}$. The number of calculations exponentially increases with the number $N_t$ of transmitters T and the cardinality of the constellation $\mathcal{C}$.

First, recognize that the regularizing constraint in equation (6) is satisfied if and only if the solution $x \in \mathcal{C}$. However, the constraint is disjoint since it can only be verified by testing all distinct combinations of the elements of $\mathcal{C}$ in x making the problem intractable in realistic massive wireless systems. To circumvent this issue, the state-of-the-art receivers including SBR, SOAV, SCSR and DAPZF in [10], [8], [9], [12], respectively, fundamentally aim at the following regularized alternative of equation (6)

$$\min_{x \in \mathbb{C}^{N_t}} \|\bar{y} - \hat{H}x\|_2^2 + \lambda \sum_{i=1}^{|C|} \|x - c_i 1\|_0, \quad (7)$$

for some penalty parameter $\lambda \geq 0$.

The latter formulations elucidate that at their core, the SOAV MIMO decoder proposed in [8] and the SCSR scheme of [9] are nothing but convexified alternatives to equations (7) with the rather classical replacement of the $\ell_0$-norm by the convex $\ell_1$-norm. The discreteness-aware state-of-the-arts detection algorithms proposed in [6-12] have significantly outperformed the conventional linear estimators (i.e., zero-forcing (ZF) and minimum mean square error (MMSE)) not only in determined but in severely underdetermined scenarios, some of which tightly approach the absolute performance lower bound. Note that one of the main advantages of the optimization-based approaches is its optimality convergence guarantee regardless of a type of channel matrices unlike message passing-based counterparts.

Despite of the above, none of them have taken full account of effects of possible distortion (i.e., CSI imperfection and AWGN noise) as shown in equation (7) indicating that they can be categorized as ZF-like solutions with discreteness-awareness in the context of comparison between the conventional ZF and MMSE estimation processes, which also implies that the interference caused by CSI errors has not yet been fully taken into account in its problem formulation.

Aiming at addressing this issue, we hereby propose a new detection algorithm fully considering both the noise and CSI imperfection effects in its detection procedure by introducing the generalized least square framework, which can be seen as a generalization of the state-of-the-art DAPZF [12].

To this end, unlike the ordinary least square approaches including ones considered in [6-12], in which homoscedasticity and serial uncorrelation of the effective noise ii are assumed, we consider a generalized least square regression problem with discreteness-aware $\ell_0$-norm regularizer, which is given by $$\min_{x\in\mathbb{C}^{N_t}} \left\|\bar{y}-\hat{H}x\right\|^H \sum\nolimits_{\tilde{n}}^{-1}\left(\bar{y}-\hat{H}x\right)+\lambda\sum_{i=1}^{|C|}\|x-c_i 1\|_0 \tag{8}$$

which minimizes the Mahalanobis distance between the output and input vectors while enforcing solutions to be a member of the discrete feasible points [14, 15].

Inspired by the fact that the error covariance matrix E can be decomposed into correlated and uncorrelated matrices, we reformulate equation (8) as $$\min_{x\in\mathbb{C}^{N_t}} \left\|\bar{y}-\hat{H}x\right\|^H \sum\nolimits_{\tilde{n}}^{corr-1}\left(\bar{y}-\hat{H}x\right)+\frac{\sigma_n^2}{1-\tau^2}\|x\|_2^2+\lambda\sum_{i=1}^{|C|}\|x-c_i 1\|_0 \tag{9}$$

where $$\sum\nolimits_{\tilde{n}}^{corr} \triangleq \frac{\tau^2}{1-\tau^2}Tr(\Phi_t)\Phi_r \tag{10}$$

The purpose of EQ9 is to Compensating correlation due to channel estimation error.

In this variation of equation 9 the 1$^{st}$ term has been modified to compensate for the effect of channel estimation error reflected as channel correlation and the 2nd has been modified to avoid the further amplification of effective noise, which follows as a consequence of channel estimation errors.

It is selected the s that directly minimizes the effect of channel correlation and noise increase created by channel estimation errors, particularly when it is large, thus creating robustness to noise and channel estimation errors, while also enforcing the solution to belong to the constellation Aiming to tackle intractable non-convexity of the $\ell_0$-norm in the ML-like formulation given in equation (9), we introduce the following adaptive $\ell_0$-norm approximation $$\|x\|_0 \approx \sum_{j=1}^{N}\frac{|x_j|^2}{|x_j|^2+\alpha} = N-\sum_{j=1}^{N}\frac{\alpha}{|x_j|^2+\alpha}, \tag{11}$$

where x denotes an arbitrary sparse vector of length N and α>0 is a free-choice parameter, whose magnitude controls the tightness of the approximation.

Substituting (5) into (9) and applying fractional programming convexification technique, we obtain $$\min_{x\in\mathbb{C}^{N_t}} \left(\bar{y}-\hat{H}x\right)^H \sum\nolimits_{\tilde{n}}^{corr-1}\left(\bar{y}-\hat{H}x\right)+\frac{\sigma_n^2}{1-\tau^2}\|x\|_2^2+\lambda\left(x^H Bx-2\mathbb{R}\left\{x^H b\right\}\right) \tag{12}$$

with $$b \triangleq \sum_{i=1}^{2^b} c_i\left[w_{i,1}\beta_{i,1}^2,\ w_{i,2}\beta_{i,2}^2,\ \ldots,\ w_{i,N}\beta_{i,N}^2\right]^T$$

$$B \triangleq \sum_{i=1}^{2^b} \mathrm{diag}\left(w_{i,1}\beta_{i,1}^2,\ w_{i,2}\beta_{i,2}^2,\ \ldots,\ w_{i,N}\beta_{i,N}^2\right) \succeq 0$$

where $w_{i,j}$ denotes a likelihood estimate corresponding to the probability that $s_j$ coincides with $$c_i,\ \sum\nolimits_{i=1}^{|C|} w_{i,j} \text{ and } \beta_{i,j} = \frac{\sqrt{\alpha}}{|s_j-c_i|^2+\alpha}.$$

One may notice that equation (12) is a differentiable convex quadratic minimization problem without any constraint, implying presence of a closed-form expression of its minimizer. To that end, equation (12) can be compactly rewritten as $$\min_{x\in\mathbb{C}^{N_t}} x^H\left(\hat{H}^H \sum\nolimits_{\tilde{n}}^{corr-1}\hat{H}+\frac{\sigma_n^2}{1-\tau^2}I_{N_t}+\lambda B\right)x - 2\mathbb{R}\left\{x^H\left(\hat{H}^H \sum\nolimits_{\tilde{n}}^{corr-1}\bar{y}+\lambda b\right)\right\} \tag{13}$$

Which readily yields $$x=\left(\hat{H}^H \sum\nolimits_{\tilde{n}}^{corr-1}\hat{H}+\frac{\sigma_n^2}{1-\tau^2}I_{N_t}+\lambda B\right)^{-1}\left(\hat{H}^H \sum\nolimits_{\tilde{n}}^{corr-1}\bar{y}+\lambda b\right) \tag{14}$$

Thus, a computer-implemented method in accordance with the present invention of estimating transmit symbol vectors transmitted in an overloaded communication channel that is characterized by a channel matrix Ĥ of complex coefficients includes receiving, in a receiver R, a signal represented by a received signal vector $\bar{y}$. The received signal vector $\bar{y}$ corresponds to a superposition of signals representing transmitted symbol vectors s selected from a constellation $\mathcal{C}$ of symbols $c_i$ that are transmitted from one or more transmitters T, plus any distortion and noise added by the channel.

In case of more than one transmitter the transmitters T are temporally synchronized, i.e., a common time base is assumed between the transmitters T and the receiver R, such that the receiver R receives transmissions of symbols from different transmitters T substantially simultaneously, e.g., within a predetermined time window. The symbols being received simultaneously or within a predetermined time window means that all temporally synchronized transmitted symbols are received at the receiver R before subsequent symbols are received, if a transmitter T transmits a sequence of symbols one by one. This may include settings in which transmitters T adjust the start time of their transmission such that a propagation delay, which depends on the distance between transmitter T and receiver R, is compensated for. This may also include that a time gap is provided between transmitting subsequent symbols.

The method further comprises defining a convex search space including at least the components of the received signal vector y and of the transmit symbol vectors s for all symbols c of the constellation $\mathcal{C}$, which is strongly biased towards the discrete constellation points by the regularizer (i.e., the third term of equation (4)), while incorporating the noise knowledge into the signal detection process unlike the other SotA discreteness-aware receivers including [6-12].

This noise and CSI imperfection awareness feature of the presented invention is the key advantage over the other SotAs, which is reached by introducing another regularization term and utilizing the generalized least square framework such that the noise amplification and CSI errors can be sufficiently suppressed, which results in the presented invention as a generalization of the state-of-the-art DAPZF.

A receiver of a communication system has a processor, volatile and/or non-volatile memory and at least one interface adapted to receive a signal in a communication channel. The non-volatile memory may store computer program instructions which, when executed by the microprocessor, configure the receiver to implement one or more embodiments of the method in accordance with the invention. The volatile memory may store parameters and other data during operation. The processor may be called one of a controller, a microcontroller, a microprocessor, a microcomputer and the like. And, the processor may be implemented using hardware, firmware, software and/or any combinations thereof. In the implementation by hardware, the processor may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor or saved in the memory to be driven by the processor.

BRIEF DESCRIPTION OF THE DRAWINGS

Flow charts depicting disclosed methods comprise "processing blocks" or "steps" that may represent computer software instructions or groups of instructions. Alternatively, the processing blocks or steps may represent steps performed by functionally equivalent circuits, such as a digital signal processor (DSP), a field programmable gate array (FPGA), an application specific integrated circuit (ASIC), or a graphics processing unit (GPU) or a computer processing unit (CPU) programmed with software instructions to perform disclosed methods. It will be appreciated by those of ordinary skill in the art that unless otherwise indicated herein, a particular sequence of steps described is illustrative only and can be varied. Unless otherwise stated, the steps described herein are unordered, meaning that the steps can be performed in any convenient or desirable order.

The invention will be further explained with reference to the drawings in which.

DETAILED DESCRIPTION

Figure 1:
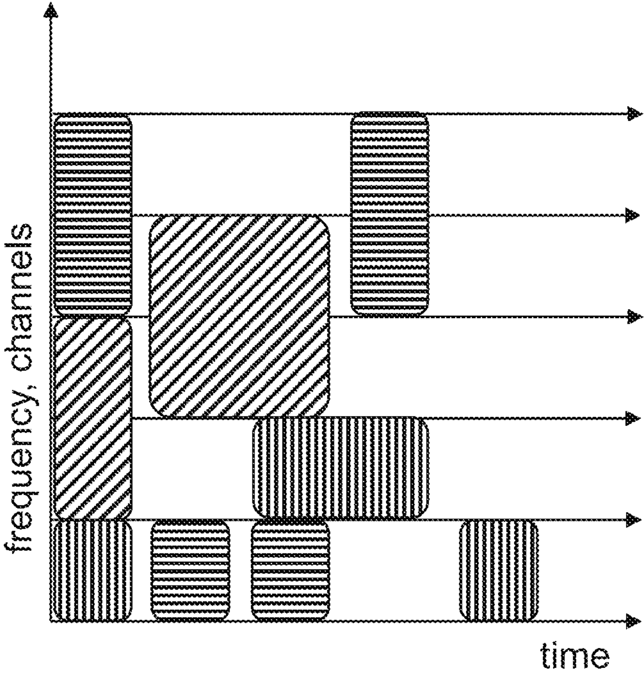
FIG. 1 shows a simplified schematic representation of orthogonal multiple access a. to a shared medium.
Figure 2A:
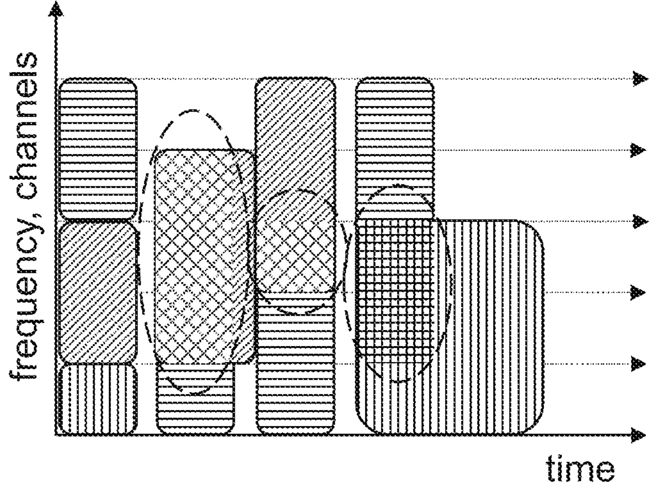
FIG. 2 shows a simplified schematic representation of non-orthogonal multiple b. access to a shared medium.
Figure 2B:
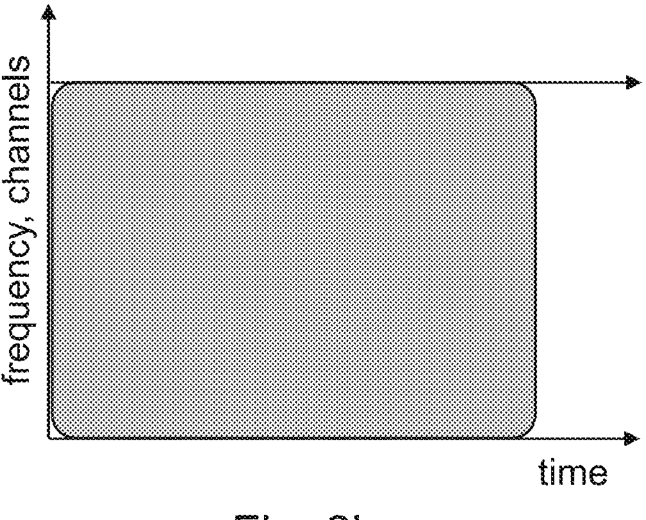

FIGS. 1 and 2 have been discussed further above and are not revisited here.

Figure 3:
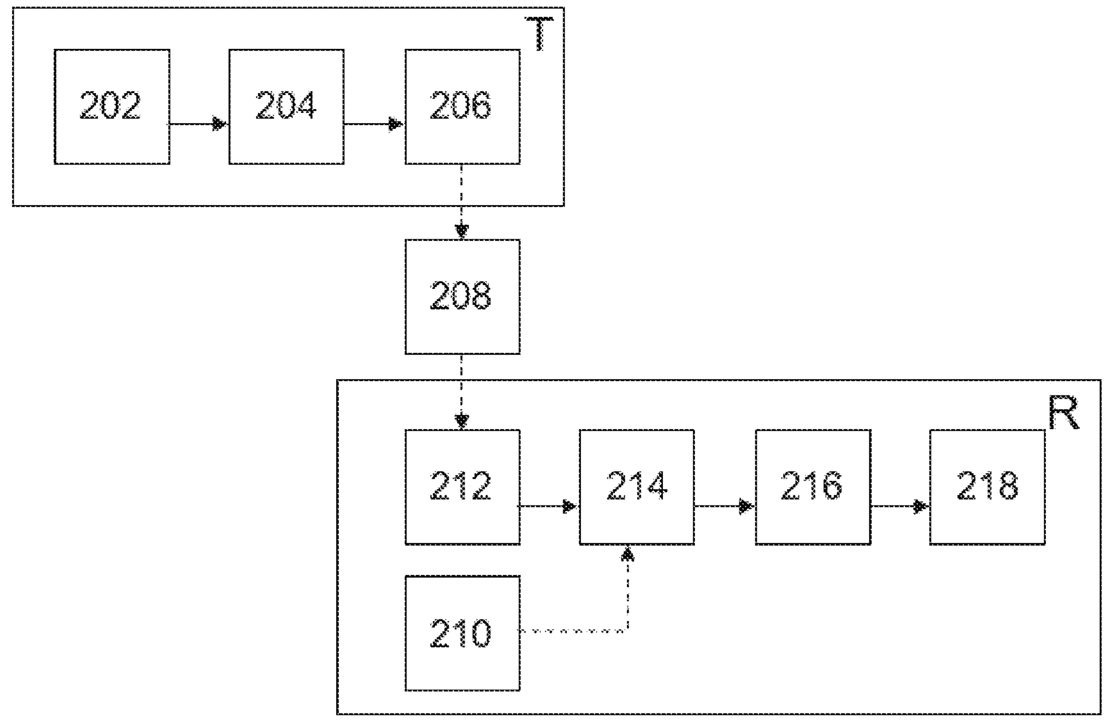
FIG. 3 shows an exemplary generalized block diagram of a transmitter and a c. receiver that communicate over a noisy communication channel, FIG. 4 Performance comparison: proposed solution and prior-art schemes.

FIG. 3 shows an exemplary generalized block diagram of a transmitter T and a receiver R that communicate over a communication channel 208. Transmitter T may include, inter alia, a source 202 of digital data that is to be transmitted. Source 202 provides the bits of the digital data to an encoder 204, which forwards the data bits encoded into symbols to a modulator 206. Modulator 206 transmits the modulated data into the communication channel 208, e.g. via one or more antennas or any other kind of signal emitter (not shown). The modulation may for example be a Quadrature Amplitude Modulation (QAM), in which symbols to be transmitted are represented by an amplitude and a phase of a transmitted signal.

Channel 208 may be a wireless channel. However, the generalized block diagram is valid for any type of channel, wired or wireless. In the context of the present invention the medium is a shared medium, i.e., multiple transmitters and receivers access the same medium and, more particularly, the channel is shared by multiple transmitters and receivers.

Receiver R receives the signal through communication channel 208, e.g. via one or more antennas or any other kind of signal receiver (not shown). Communication channel 208 may have introduced noise to the transmitted signal, and amplitude and phase of the signal may have been distorted by the channel. The distortion may be compensated for by an equalizer provided in the receiver (not shown) that is controlled based upon channel characteristics that may be obtained, e.g., through analysing pilot symbols with known properties transmitted over the communication channel. Likewise, noise may be reduced or removed by a filter in the receiver (not shown).

A signal detector 212 receives the signal from channel and 210 tries to estimate the CSI error parameter $\tau$ from a series of received signals that accumulate over previous transmissions. Signal detector 212 forwards the estimated signal to a decoder 214 that decodes the estimated signal into an estimated symbol. If the decoding produces a symbol that could probably have been transmitted it is forwarded to a de-mapper 216, which outputs the bit estimates corresponding to the estimated transmit signal and the corresponding estimated symbol, e.g., to a microprocessor 218 for further processing.

A signal detector 210 receives the signal from the channel and tries to estimate, from the received signal, which signal had been transmitted into the channel. Signal detector 210 forwards the estimated signal to a decoder 212 that decodes the estimated signal into an estimated symbol. If the decoding produces a symbol that could probably have been transmitted it is forwarded to a de-mapper 214, which outputs the bit estimates corresponding to the estimated transmit signal and the corresponding estimated symbol, e.g., to a microprocessor 216 for further processing. Otherwise, if the decoding does not produce a symbol that is likely to have been transmitted, the unsuccessful attempt to decode the estimated signal into a probable symbol is fed back to the signal detector for repeating the signal estimation with different parameters. The processing of the data in the modulator of the transmitter and of the demodulator in the receiver are complementary to each other.

While the transmitter T and receiver R of FIG. 3 appear generally known, the receiver R, and more particularly the signal detector 210 and decoder 212 of the receiver in accordance with the invention are adapted to execute the inventive method described hereinafter and thus operate different than known signal detectors.

Figure 4:
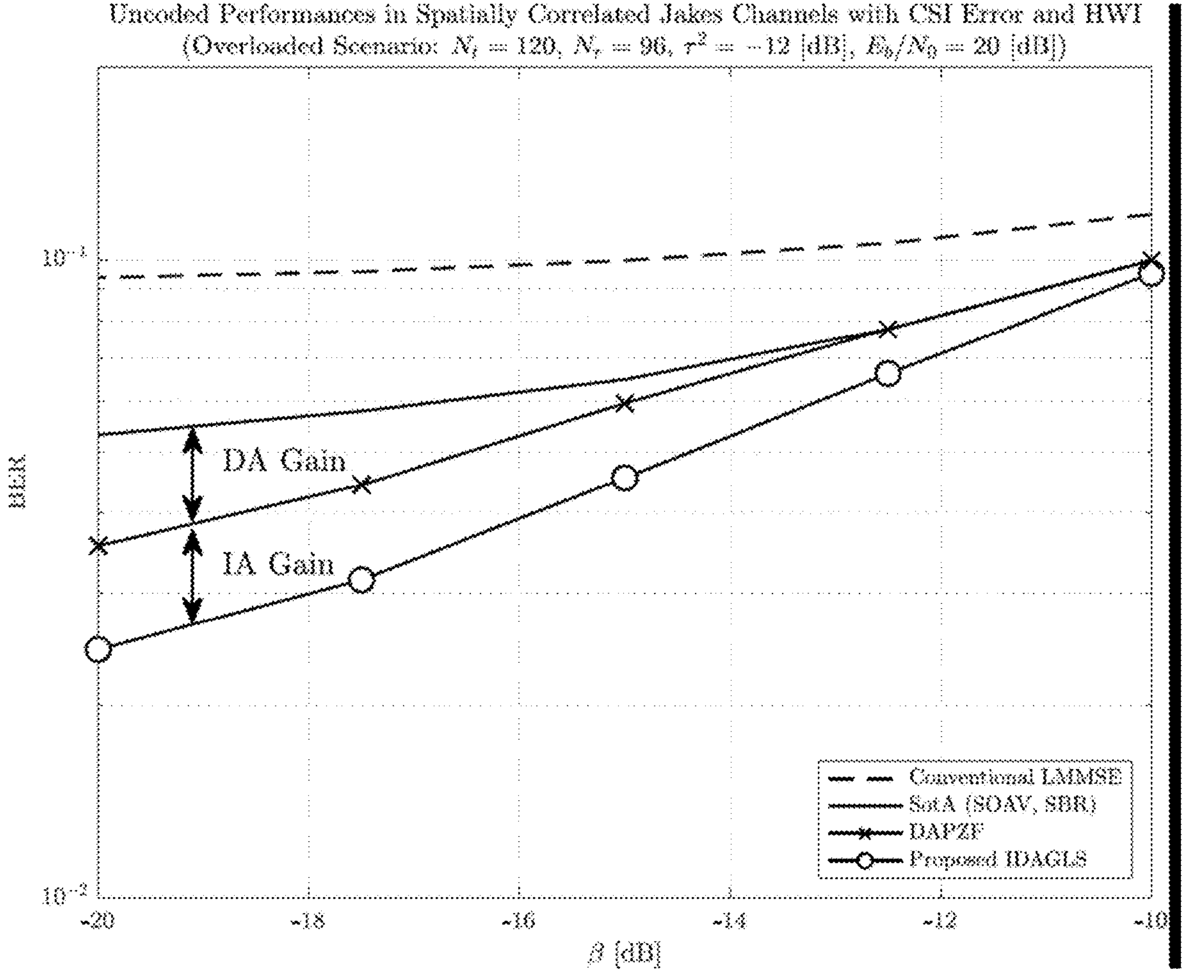

FIG. 4 describes the performance evaluation in comparison with the state-of-the art receivers. It shows the uncoded BER performance evaluation of the proposed method in comparison with the state-of-the-art signal recovery methods.

As it can be seen from the FIG. 4, the proposed scheme provides significant gain (more than one order of magnitude) in terms of reliability (BER) with respect to existing methods in cases where the CSI estimation error is tolerable ($T^2$<13 db). In the figure, the total gain has been decomposed in terms of the one due to the Discrete Awareness (DA gain) and the additional one obtained due to the Impairment Awareness (IA), for convenience.

To realize 5G and Beyond 5G, various technologies are proposed, including Massive multiple-input multiple output (MIMO), Cooperative MIMO, millimeter wave (mmWave) communications, NOMA, device-to-device (D2D), proximity services (ProSe), mobile relays, airborne relays, software-defined networking, fog computing, and distributed Artificial Intelligence (AI). Many infrastructure functions can be pushed with the help of this proposed method to the network's edge to reduce latency, extend coverage, enhance versatility, and exploit the computational resources of the vast number of user devices. Mobile edge computing (MEC) can promptly process computationally intensive jobs offloaded from mobile devices, thus reducing end-to-end latency. Edge computing modules can be in a base transceiver stations, relay, or user equipment.

Aspects disclosed herein are broadly applicable to wireless standards and use case families disclosed herein, including (but not limited to) cellular, mobile broadband, vehicular ad-hoc networks, fixed broadband, Internet of Things (IoT), peer-to-peer networks, mesh networks, wireless personal area networks (WPANs), wireless local area networks (WLANs), wireless sensor networks, airborne networks, satellite networks, network fabrics, software-defined networks (SDNs), and hybrid networks.

The invention claimed is:

1. A computer-implemented reconstruction method of discrete digital signals in noisy overloaded wireless communication systems with CSI errors that is characterized by a channel matrix of complex coefficients, the method including Receiving the signal from channel by a signal detector Estimation of the CSI error parameter t is done at the receiver Estimation noise power is done by a noise power estimator Forwarding the detected signal and the CSI error parameter t and noise power estimation to a decoder that estimates the transmitted symbol(s), wherein the estimation of the decoder produces a symbol that could probably have been transmitted it is forwarded to a de-mapper, which outputs the bit estimates corresponding to the estimated transmit signal and the corresponding estimated symbol to a microprocessor for further processing, and wherein channel correlation is assumed to channel estimation error and the CSI error parameter $\tau$ is incorporated within the covariance matrix capturing this correlation.

2. The method of claim 1, wherein minimizing the effect of channel estimation error is done by compensating of the noise increase and the channel correlation within the objective function used by decoder.

3. The method of any one of claim 1, wherein the minimizing the effect of channel estimation error to the minimization formulation via a first function, a second function, a third function used to estimate the transmit signal(s)

$$\min_{x \in \mathbb{C}^{N_t}} \left(\overline{y} - \hat{H}x\right)^H \sum\nolimits_{\tilde{n}}^{corr-1} \left(\overline{y} - \hat{H}x\right) + \frac{\sigma_n^2}{1-\tau^2} \|x\|_2^2 + \lambda \sum_{i=1}^{|C|} \|x - c_i 1\|_0$$

4. The method of claim 3, wherein the fractional programming algorithm is targeted to find a value of the third function that is lower than the global minimum of the first function.

5. The method of claim 3, wherein the first function is a Euclidian distance function centred around the received signal's vector including the channel correlation effect.

6. The method of claim 3, wherein the second function is the product of the estimated noise power and transmit signal power scaled by the channel estimation error parameter.

7. The method of claim 3, wherein the third function is a function based on or tightly approximating the $l_0$-norm.

8. A receiver of a communication system having a processor, volatile and/or non-volatile memory, at least one interface adapted to receive a signal in an communication channel, wherein the non-volatile memory stores computer program instructions which, when executed by the microprocessor, configure the receiver to implement reconstruction of discrete digital signals in noisy overloaded wireless communication systems with CSI errors that is characterized by a channel matrix of complex coefficients, by performing operations including:

Receiving the signal from channel by a signal detector

Estimation of the CSI error parameter t is done at the receiver

Estimation noise power is done by a noise power estimator

Forwarding the detected signal and the CSI error parameter $\tau$ and noise power estimation to a decoder that estimates the transmitted symbol(s), wherein the estimation of the decoder produces a symbol that could probably have been transmitted it is forwarded to a de-mapper, which outputs the bit estimates corresponding to the estimated transmit signal and the corresponding estimated symbol to a microprocessor for further processing, and wherein channel correlation is assumed to channel estimation error and the CSI error parameter $\tau$ is incorporated within the covariance matrix capturing this correlation.

9. The receiver of claim 8, wherein minimizing the effect of channel estimation error is done by compensating of the noise increase and the channel correlation within the objective function used by decoder.

10. The receiver of any one of claim 8, wherein the minimizing the effect of channel estimation error to the minimization formulation via a first function, a second function, a third function used to estimate the transmit signal(s)

$$\min_{x \in \mathbb{C}^{N_t}} \left(\overline{y} - \hat{H}x\right)^H \sum\nolimits_{\tilde{n}}^{corr-1} \left(\overline{y} - \hat{H}x\right) + \frac{\sigma_n^2}{1-\tau^2} \|x\|_2^2 + \lambda \sum_{i=1}^{|C|} \|x - c_i 1\|_0$$

11. The receiver of claim 10, wherein the fractional programming algorithm is targeted to find a value of the third function that is lower than the global minimum of the first function.

12. The receiver of claim 10, wherein the first function is a Euclidian distance function centred around the received signal's vector including the channel correlation effect.

13. The receiver of claim 10, wherein the second function is the product of the estimated noise power and transmit signal power scaled by the channel estimation error parameter.

14. The receiver of claim 10, wherein the third function is a function based on or tightly approximating the $l_0$-norm.

* * * * *